United States Patent
Linaker

(10) Patent No.: US 6,878,014 B2
(45) Date of Patent: Apr. 12, 2005

(54) ELECTRICAL CONNECTOR ASSEMBLY AND CONTAINER

(76) Inventor: Derek Linaker, 23 Ashworth Park, Knutsford, Cheshire (GB), WA16 9DE ( * ) Notice: Subject to any disclaimer, the term of this patent is extended or adjusted under 35 U.S.C. 154(b) by 103 days.

(21) Appl. No.: 10/446,346

(22) Filed: May 28, 2003

(65) Prior Publication Data
US 2004/0253877 A1 Dec. 16, 2004

(30) Foreign Application Priority Data

Nov. 29, 2000 (GB) .............................. 0029068

(51) Int. Cl.[7] ........................ H01R 25/16; H01R 11/09; H02B 1/20
(52) U.S. Cl. ........................................ 439/688; 439/85
(58) Field of Search .......................... 439/688, 85, 686, 439/689

(56) References Cited

U.S. PATENT DOCUMENTS 2,640,183 A * 5/1953 Arthur ......................... 439/688
3,432,796 A * 3/1969 Reimer ......................... 439/85
5,057,026 A * 10/1991 Sawai et al. ................ 439/76.2

FOREIGN PATENT DOCUMENTS

| | | | |
|---|---|---|---|
| CH | 684721 | * | 11/1994 |
| DE | 295 18 559 u1 | | 4/1996 |
| DE | 19622895 | * | 12/1996 |
| EP | 000649204 A1 | * | 4/1995 |
| EP | 001313179 A2 | * | 5/2003 |
| JP | 2001069649 | * | 3/2001 |
| WO | WO 98/11635 | | 3/1998 |

* cited by examiner

Primary Examiner—Michael C. Zarroli
(74) Attorney, Agent, or Firm—Pearson & Pearson, LLP

(57) ABSTRACT

An electrical connector assembly has live-phase conductive strips (5) potted in a solid polymer body (4). The strips are cut to provide transverse terminals (5a) on opposite sides. The polymer body (4) is confined within a housing (3) which is made from a series of body sections (6) joined end-to-end. These sections (6) extend around the periphery of the body (4) and have slots (11) through which the terminals (5a) project. Each section may be formed from two shells (7, 8) joined at longitudinal edges. A desired housing length can be built up by selection of an appropriate number of body sections (6). The assembly (24) can be enclosed within a box-shaped container (25) together with electrical devices (2), such as switches, connected to the assembly (24) and having operating members (33) which are accessible through openings (31) in a top wall (30) of the container (25). The devices (2) may be covered by a sideways adjustable strip (43) with press-out sections (44) to form opening for the operating members (33).

26 Claims, 5 Drawing Sheets

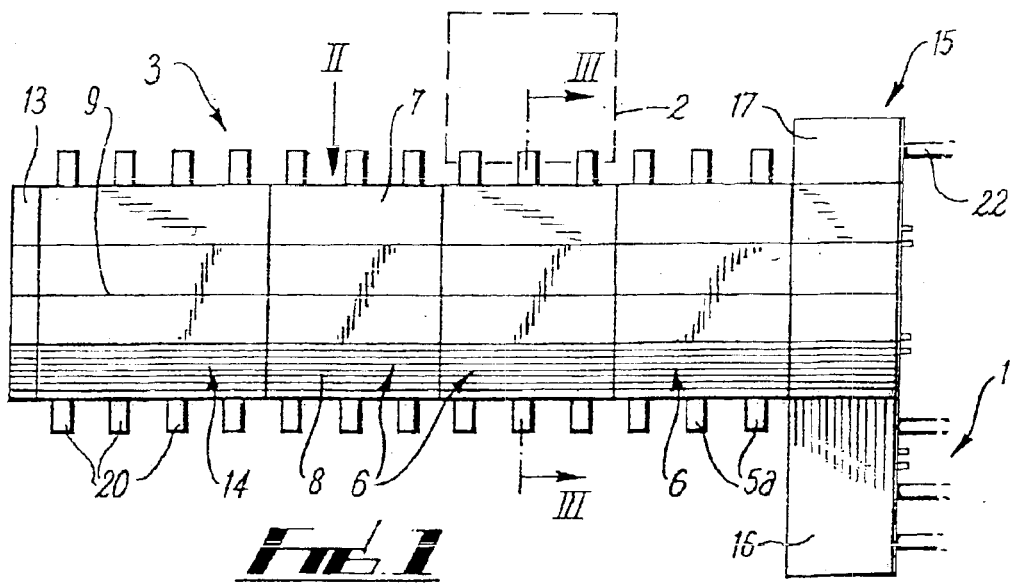
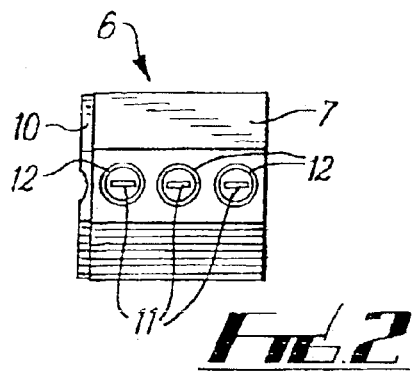
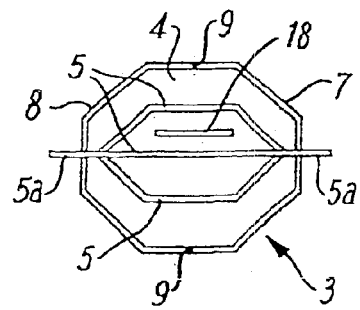
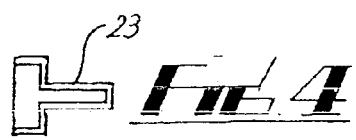
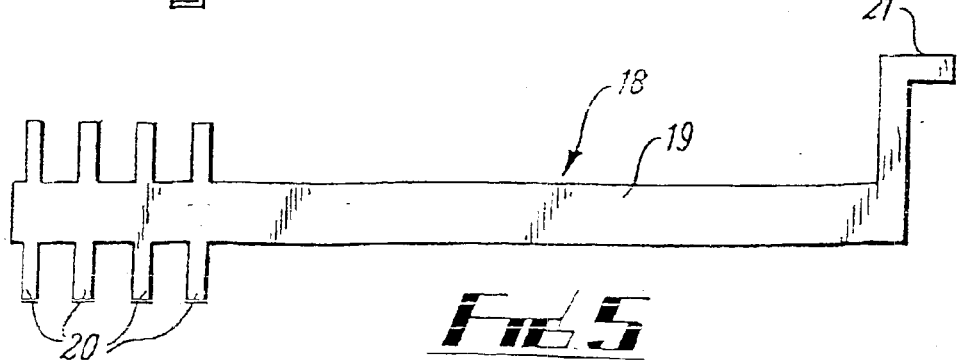

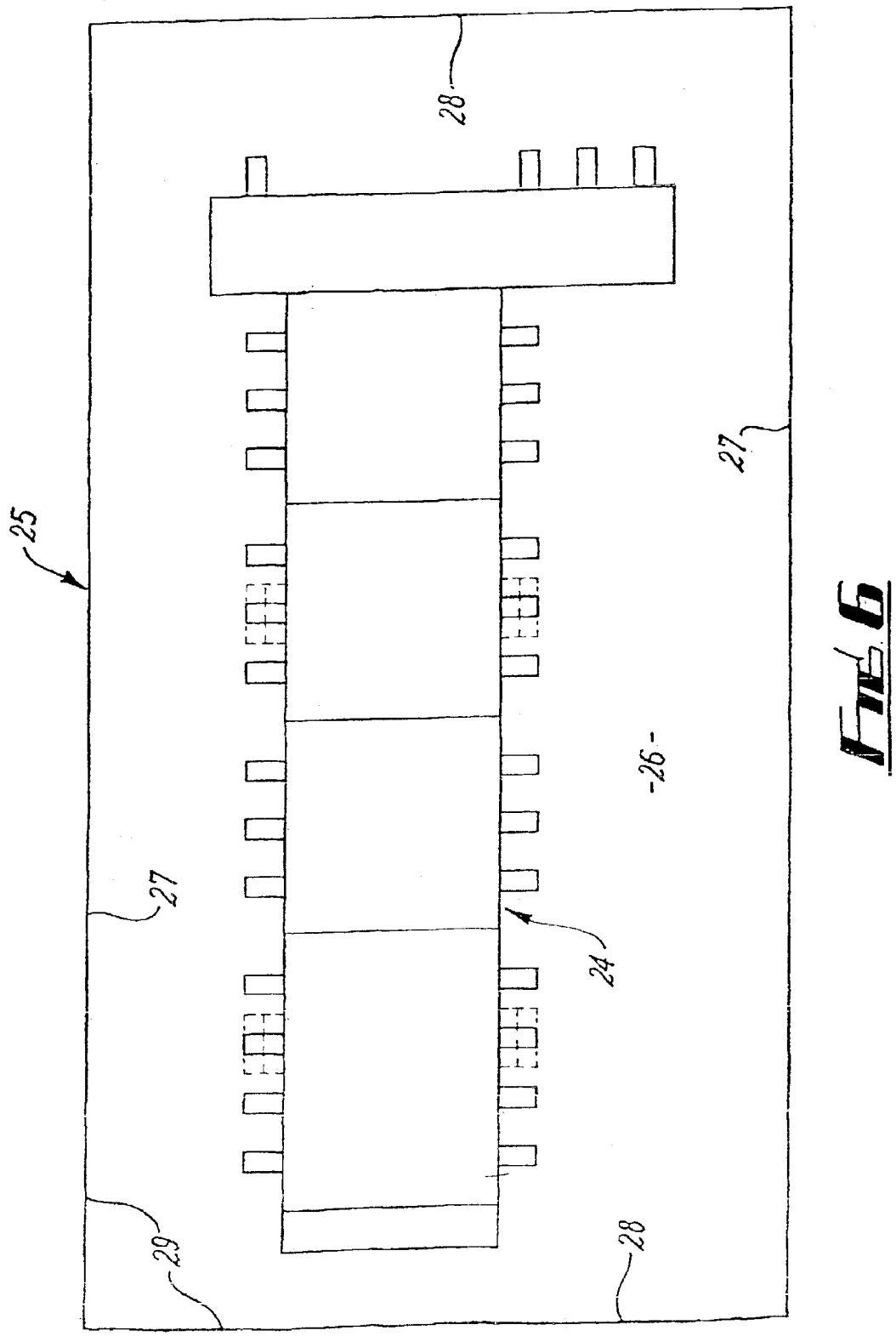

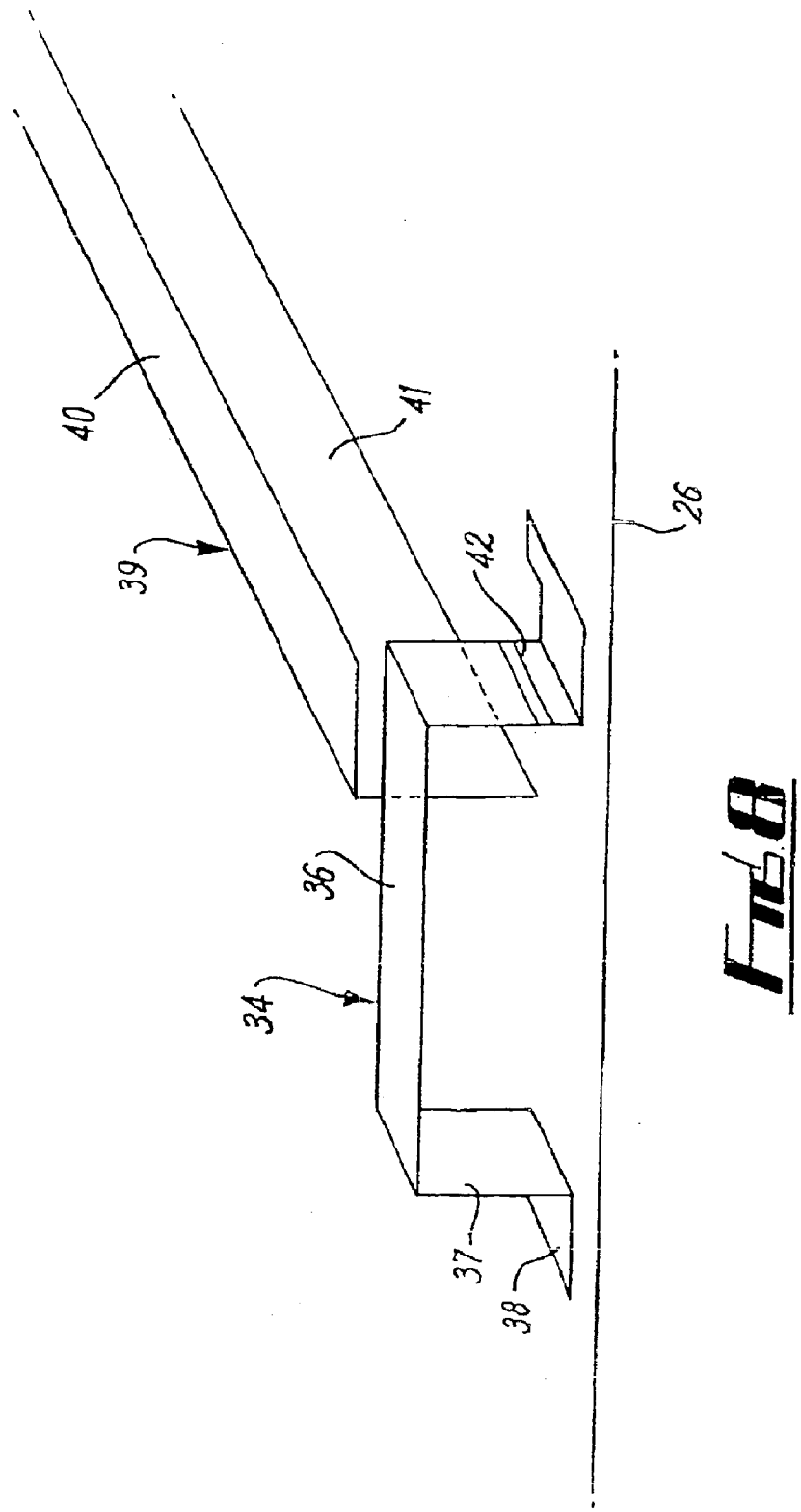

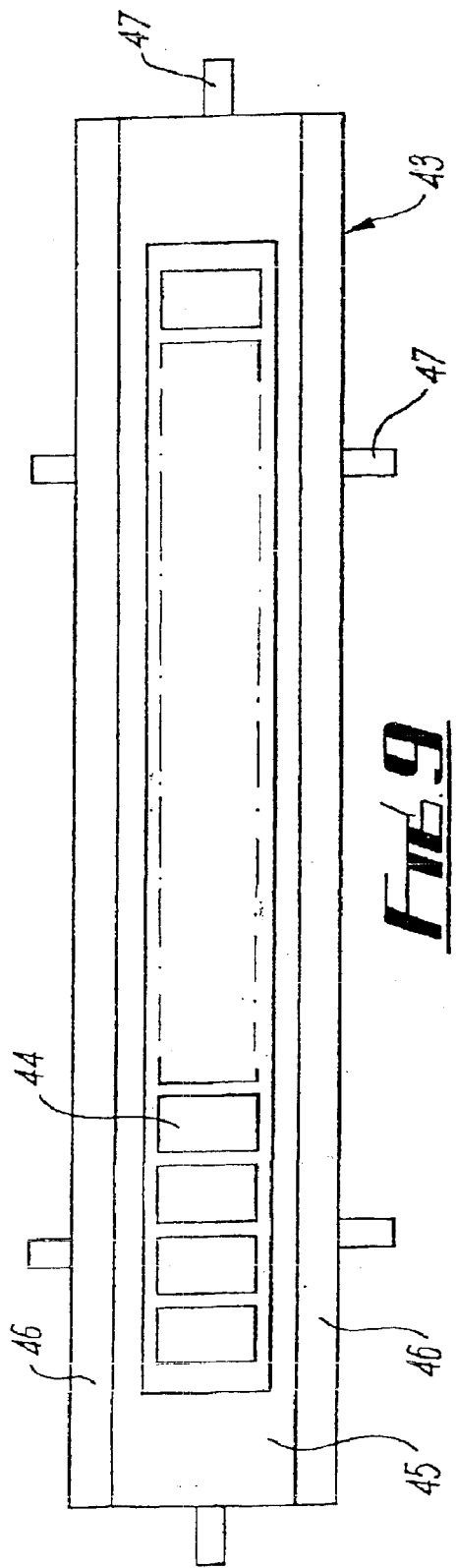
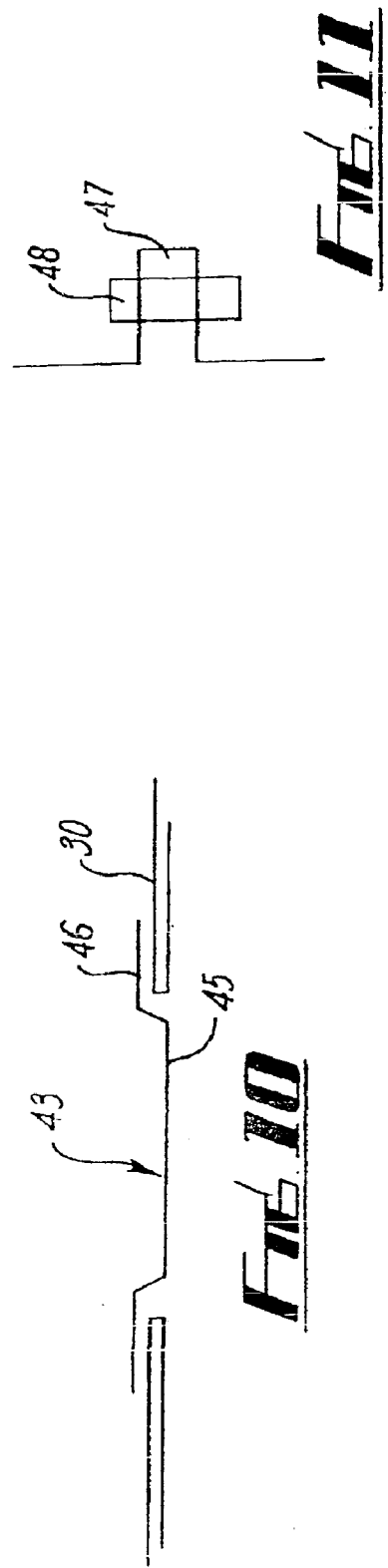

ELECTRICAL CONNECTOR ASSEMBLY AND CONTAINER

This invention relates to an electrical connector assembly of the bus-bar type and a container for the assembly.

GB 2234922B describes an electrical connector assembly comprising a plurality of conductors disposed in spaced relationship one on top of another, each conductor being made from a strip of conductive material cut to define an elongate body with outwardly extending terminals. As described in this patent the conductive material between the terminals is bent away but retained as part of the conductor, and the respective conductors are held in spaced relationship and insulated by 'potting' in a solid body of synthetic polymeric material or resin.

With this known arrangement a high current carrying capability can be safely and reliably achieved with a relatively inexpensive structure.

In use the terminals are connected to electrical devices such as switches or isolators by direct engagement with screw connectors thereof. For a three-phase supply, there may be three live conductors providing groups of three terminals (one for each phase) spaced along each side of the assembly, the terminals of each group on one side being aligned with the terminals of one of the groups on the other side. With this arrangement, multiple electrical devices of the same kind can be conveniently arranged side by side along each side of the assembly, the devices on one side being respectively aligned with those on the other side.

It is also possible to incorporate neutral terminals as described in WO 96/09669.

The assemblies specifically described in the above mentioned patent specifications are particularly suitable for heavy duty applications and therefore may be relatively massive structures made to accommodate a predetermined configuration of electrical switches (or other electrical devices).

There is however a requirement, particularly for lighter duty applications, for assemblies which can be made to accommodate different configurations of electrical devices.

According to one aspect of the invention therefore there is provided an electrical connector assembly comprising a plurality of elongate main conductors disposed one on top of the other embedded within a solid body of polymeric material which holds the conductors spaced from and insulated relative to each other with a plurality of main terminals extending on opposite sides transversely therefrom, wherein the said body of polymeric material is contained within a pre-formed elongate housing, characterised in that the housing is pre-formed from a series of body housing sections which extend in the longitudinal direction of the body and which are interconnected end-to-end by interengagement of cooperable configurations at such ends thereof.

With this arrangement an assembly of a desired length, appropriate to a desired configuration of electrical devices which can be connected to the transverse terminals thereof, can be readily built up by selection of the corresponding number of body housing sections to be interconnected.

Most preferably each body housing section is constructed to extend around and enclose the entire periphery of the body of polymer material. In particular, each body housing section may be polygonal, e.g. octagonal in cross-section.

Preferably also each body section is made of two parts or shells which are assembled by interengagement of cooperable configurations at longitudinally extending side edges thereof.

The cooperable configurations at the ends of the body sections may take any suitable form. Conveniently tongue and groove configurations may be used.

The aforesaid cooperable configurations at the side edges of the body housing section parts or shells may also take any suitable form and conveniently also may comprise tongue and groove configurations.

Additionally, the housing may have, at at least one end, an end section which preferably also has configurations which cooperably interengage, e.g. by a tongue and groove configuration, with the end of the adjacent body section. Such end section may comprise a cap which covers and seals the end of the housing. However, additionally, at least one end, the end section may provide an enclosure or enclosures to receive end connection terminals for the conductors and/or to receive neutral cross-bars.

The or each such end section may be formed, like the body sections, from parts or shells interconnected e.g. with tongue and groove configurations.

The body sections may have slots therethrough to receive the transverse terminal s, preferably in two sets on opposite sides, e.g. in opposite said parts or shells, preferably aligned with each other. The slots may be bounded by recesses, particularly annular recesses, to receive tightly fitting grommets or caps around the terminals to seal these during introduction of the polymeric material.

The conductors preferably comprise strips of conductive material cut to define an elongate body with the transverse terminals extending outwardly therefrom. If desired, the conductive material between the terminals may be folded back as described in GB 2234922B.

There may be three conductive strips for three live phases, and correspondingly each body section may have at each of two opposed sides three slots to receive three transverse terminals respectively of each phase.

If desired there may be a neutral strip providing one or more fourth, neutral terminals. Conveniently this neutral strip may run along the housing and this may provide fourth, neutral terminals to be received by fourth slots in each housing section, or alternatively it may provide one such fourth terminal or group of fourth terminals only at one end region of the housing e.g. received by a slot or slots of a special body section at such end. The neutral strip may be inserted between two of the live phases.

The use of an inserted neutral strip provides a simple, compact, convenient means for providing neutral connection. Moreover, an embedded strip facilitates reliable heavy duty current handling in so far as it avoids the need for (or minimises the use of) screw connectors, wires and like components which can give rise to current handling problems.

The neutral strip may be cut from a single sheet which may be folded to give extra current carrying capacity.

The body sections may all be of like construction apart from any special end section as mentioned above.

The assembly described above may be mounted within a container having a front wall with elongate openings to provide access to operating members of switches or other electrical devices connected to the assembly within the container. Electrical devices of different origin (e.g. from different manufacturers) may have slight differences in dimensions. If the elongate openings are made large enough to accommodate these dimension differences there is the problem that electrical terminals of under-sized devices may be undesirably exposed.

With a view to overcoming this problem, and in accordance with a further aspect of the invention there is provided a container, particularly for an assembly as described above, which is adapted to house the assembly, said container having a front wall with at least one elongate opening therein to provide access to electrical devices connected to the assembly within the container, a nd wherein a cover strip is mountable over the opening, characterised in that the cover strip has portions thereof adapted to provide access slots for said electrical devices and the cover strip is position ally adjustable.

Preferably, the cover strip is wider than the opening and is positionally adjustable by sliding sideways whilst covering the opening. In particular, the cover strip may be slideable between limits and, in a particularly preferred embodiment, the limits are defined by engagement of at least one finger projecting from the cover strip with a respective closed end channel or slot on the front wall.

The said portions of the strip may be push-out sections.

Also with a view to accommodating differences in dimensions of different electrical devices, and in accordance with a further aspect of the invention, there is provided a container, particularly for an assembly as described above, which is adapted to house the assembly, said container having a back wall on which the assembly is mountable via the intermediary of raised bridge structures having legs extending transversely to the back wall and an elongate support structure arranged to be fixed to the legs along at least one side of the assembly characterised in that the support structure is fixable to the legs at a plurality of positions differently spaced from the back wall.

Preferably guide markings are provided on the legs for alignment with the support structure at the said different positions.

The support structure may comprise an angle strip.

The invention will now be described further by way of example only and with reference to the accompanying drawings in which:

FIG. 1 is a diagrammatic plan view of one form of an assembly according to the invention;

FIG. 2 is a side detail on the arrow II of FIG. 1;

FIG. 3 is a sectional view on the lines III—III of FIG. 1;

FIG. 4 is a sectional view to an enlarged scale of a grommet used with the arrangement of FIG. 1;

FIG. 5 is a diagrammatic plan view of a neutral conductor;

FIG. 6 is a plan view of the assembly of FIG. 1 within a container with a front wall removed;

FIG. 8 is an enlarged perspective view of part of a bracket arrangement for mounting the assembly within the container;

FIGS. 9 & 10 are plan and sectional views of an insert strip of the front wall shown in FIG. 7; and FIG. 11 is an enlarged detail.

Figure 7:
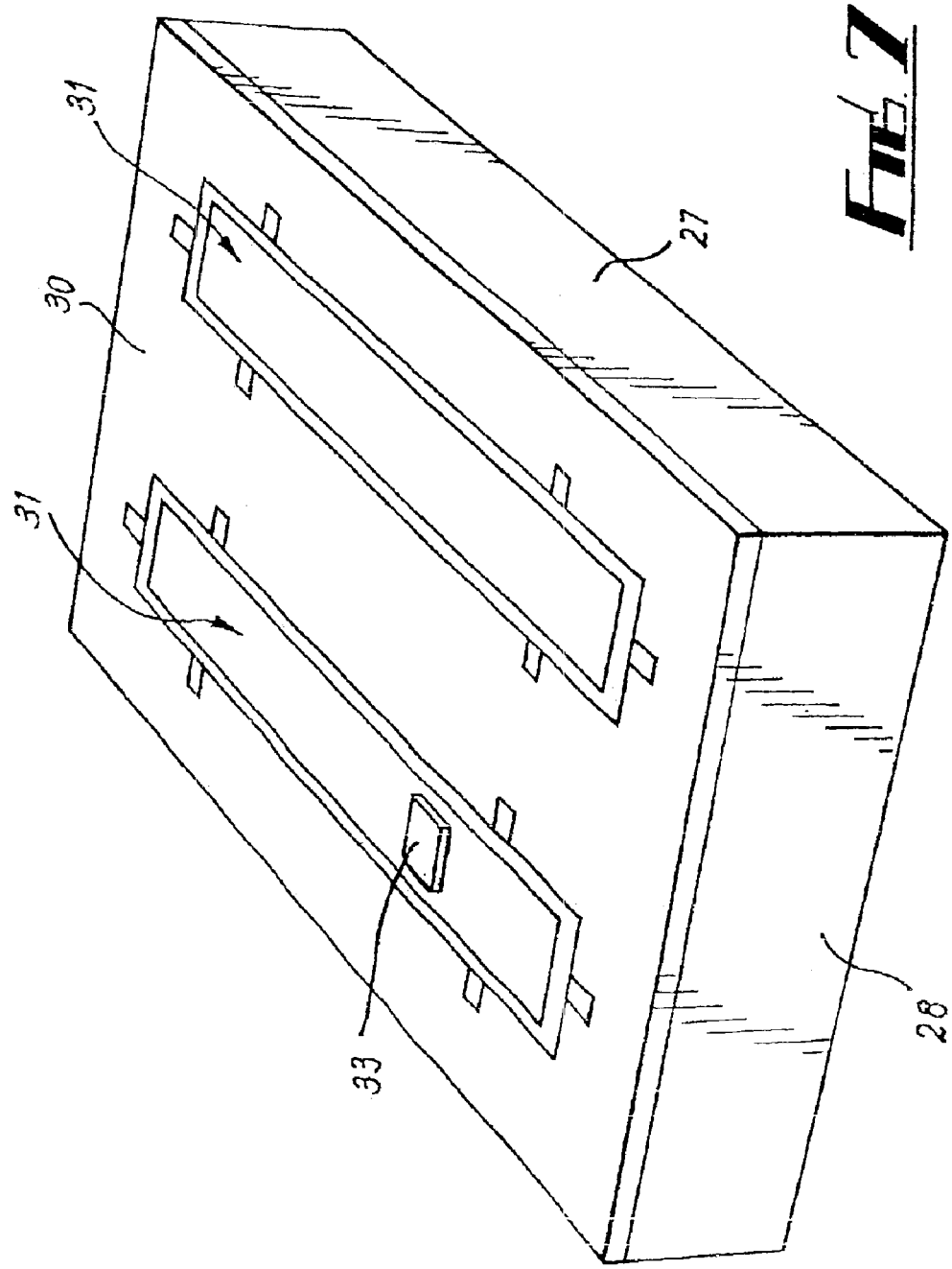
FIG. 7 is a perspective view of the container with the front wall in position.

Referring to FIGS. 1–5 of the drawings, there is shown an electrical connector assembly to be interposed between a three-phase mains supply 1 and a plurality of switches or isolators 2.

The assembly comprises an elongate housing 3 enclosing a solid body of polymeric material 4 in which three elongate live conductor strips 5 are 'potted' so as to be held one on top of the other spaced apart and insulated from each other.

The housing 3 is constructed from a plurality of identical body sections 6 interconnected end to end.

Each body section 6 is made from two injection-moulded plastics shells 7, 8 which are interconnected along longitudinal edges 9.

The interconnection between such edges 9 is effected by insertion of a tongue and a groove on the edges of one shell 7 with a complementary tongue and groove on the other shell 8.

Similarly the interconnection between ends of the body sections 6 is effected by insertion of tongues 10 on one end with complementary grooves on the adjacent end.

The interconnected shells 7, 8 define body sections 6 of octagonal cross-section.

The central face of each shell 7, 8 of each body section 6 contains three longitudinally extending slots 11, the slots 11 on one shell 7 being aligned respectively with those on the opposite shell 8. Each slot 11 is bounded by an annular groove or recess 12.

The three live conductors 5 are cut to define a central longitudinal body part and transversely extending terminals 5a on opposite sides. These terminals 5a extend through the slots 11.

At one end of the housing 3 there is a special end body section 14 which is constructed in identical manner to the other body sections 6 but is longer and has on each shell a fourth slot. At this end of the housing 3 there is a sealing end cap 13 which engages the adjacent end body section 6 by a tongue and groove interfit.

At the opposite end of the housing an end section 15 is fitted on to the end body section 6, such end section 15 having two shells which interfit with each other and with the end body section 6 by means of tongue and groove configurations. This end section 15 has opposite rectangular housing extensions 16, 17.

End terminal extensions of the three live conductors 5 are bent to one side and extend into one of the extensions 16 for connection to external live supply leads 1. Removable rubber end caps may be provided to protect these end extensions.

There is also a fourth (neutral) conductive strip 18 (FIG. 5) which has an elongate body part 19 which extends between two of the live conductors 5 and has transverse side terminals 20 at one end which extend through the fourth slots of the special end section 14. The neutral strip has an end extension 21 which is bent to one side and downwards and extends into the other housing extension 15 for connection to an external neutral lead 22.

The assembly so far described is constructed by assembling the desired number of body sections 6, 14 around the conductive strips 5, arranging the body sections 6, 14 vertically with the sealing end cap 13 in position and lowermost, and then pouring polymeric material into the sections 6, 14 up to the level of the top of the special end section 14.

During this procedure, grommets 23 as shown in FIG. 4 are fitted tightly over the terminals 5a, 20 projecting through the slots 11, such grommets 23 being pushed into the annular grooves 12, to seal the slots 11 around the terminals 5a, 20.

The end section 15 is then fitted and the polymeric material is allowed to set.

The resulting assembly can be used with different switches and isolators 2 and in the region of the special end section 15 four pole devices requiring a neutral can be used. A four pole main switch can be fitted on the end terminals before the leads 1, 21, and a four pole switch or lightning protector or the like can be fitted at the end section 14 and adjacent section 6 to give earth; or earth and live connections.

With this arrangement the assembly can be constructed to a desired length in simple and convenient manner.

In use, the assembly 24 described above is mounted within a box-shaped metal container 25 which has a rectangular flat back wall 26 and integral peripheral rectangular flat side and end walls 27, 28.

The side and end walls 27, 28 have coplanar free edges 29 which define a rectangular front opening across which a flat rectangular front wall 30 can be removably attached e.g. as a lockable hinged lid or bolted panel or the like.

The front wall 30 has two parallel rectangular slot-shaped openings 31 therethrough.

The dimensions of the container 25 are adequate to contain and enclose the assembly 24 and provide adequate space around the assembly for power connection leads and for attachment of electrical devices 2 i.e. the aforementioned switches, isolators, etc.

Connection of the devices 2 to the assembly 24 involves positioning the devices 2 such that one set 32 of the assembly terminals 5a engage cooperable sockets on the device 2 and an operating member 33 (e.g. a manually operable switch element or the like) projects upwardly through one of the openings 31 for operation externally of the container 25, as described further hereinafter.

The assembly 24 is mounted on the back wall 26 of the container 25 via rigid metal bridge structures 34 at spaced positions along the length of the assembly 25.

Each bridge structure 34 has a top strip-shaped part 36, two downwardly projecting legs 37 and two outwardly projecting feet 38.

The flat top part 37 has holes by means of which the assembly 24 is bolted on top of the bridge structure 34. The feet 38 have holes by means of which the bridge structure 34 is bolted or rivetted to the back wall 26.

At each side a respective metal angle strip 39 is fixed to the adjacent legs of the bridge structures by means of a bolt and rivets.

The angle strips 39 provide outwardly projecting flat surfaces 40 parallel to the back wall 26 for supporting the devices 2.

To accommodate small variations in the dimensions of different devices (e.g. devices of different manufacturing origin) the positions of the angle strips 39 can be adjusted up and down perpendicularly to the back wall 26. Thereby the angle strips 39 can be pre-set for use with a particular range of devices 2 (e.g. devices of a particular manufacturer).

This adjustment is effected using a single bolt hole and multiple rivet holes in the legs 37 of the bridge structures 34 in combination with elongate bolt slots and rivet holes in the upright part 41 of the angle strip 39. The required position of the strip 39 is selected with a nut and bolt loosely engaged with the bolt hole and one slot. The nut is then tightened and rivets are engaged with appropriate aligned rivet holes.

To aid selection of a desired position appropriate to a particular range of devices, the legs may be marked with differently identified (e.g. differently coloured) transverse lines 42 or the like against which the lower edge of the strip part 41 can be aligned.

The transverse dimensions of the devices 2 i.e. perpendicular to the assembly 24 parallel to the back wall 26, will also differ slightly for devices of different origin and it is desirable for the widths of the openings 31 to be large enough to accommodate all such variations. However, this gives rise to the possible problem that a smaller dimension device 2 used with such a wide slot might give rise to unsafe exposure of electrical connections of the devices 2. To avoid this, the openings 31 are covered with strips 43 which contain push-out sections 44 to define slots for the operating members 33 of the devices 2.

Each strip 43 is a flexible, self supporting thin rectangular strip formed from metal or plastics with a central part 45 shaped so as to extend in a plane slightly displaced from edge 46 regions of the strip 43 for strengthening purposes.

The central part 45 contains a series of successive side-by-side rectangular sections 44 extending over a major part of the length of the strip. The sections 44 are separated by slits from the remainder of the strip, such slits extending around the peripheries of the sections except for small remaining portions of material at the corners.

The strips 43 have projecting fingers 47 at the ends and/or at the sides which slidably engage short closed end guide channels or slots 48 formed in the front wall of the container (e.g. formed by pressed out strips 48 of the material forming the front wall as shown in FIG. 11). The strips 43 are thereby held in position covering the openings but are capable of limited sideways sliding movement i.e. parallel to the front wall 30 and transverse to the length of the openings 31. The strips 43 are wider than the openings so that they wholly cover the openings even when displaced slightly sideways.

The slot defined by pushing-out a section 44 is of appropriate dimensions to receive and thereby provide access to an operating member 33 of a device 2. Any variation in the location of the operating member 33 is accommodated by sideways sliding of the strip 43. Different devices 2 can thereby be accommodated within an opening 31 of large enough width without risk of undesired exposure of electrical parts of the device 2.

In practice only some sections 44 may be removed to accommodate devices 2. Those sections 44 which are not removed provide a neat, aesthetic finish between the devices 2. In the case where a section 44 is undesirably removed, e.g. inadvertently, the resulting open slot in the strip 31 can be readily covered using a conventional push-in insert as used to fill gaps in conventional smaller-width openings 43.

The use of the adjustable bridge structures 34 and angle strips 39 together with the slideable strips 31 provides versatility enabling neat, safe and convenient use of the container 25 with devices 2 of different origin.

It is of course to be understood that the invention is not intended to be restricted to the details of the above embodiment which are described by way of example only.

What is claimed:

1. An electrical connector assembly comprising a plurality of elongate main conductors (5) disposed one on top of the other embedded within a solid body of polymeric material (4) which holds the conductors spaced from and insulated relative to each other with a plurality of main terminals (5a) extending on opposite sides transversely therefrom, wherein the said body of polymeric material (4) is contained within a pre-formed elongate housing (3), characterized in that the housing (3) is pre-formed from a series of body housing sections (6) which extend in the longitudinal direction of the body and which are interconnected end-to-end by interengagement of cooperable configurations at such ends thereof.

2. An assembly according to claim 1 characterized in that each body housing section (6) is constructed to extend around and enclosed the entire periphery of the body of polymeric material.

3. An assembly according to claim 2 characterized in that each body housing section (6) is polygonal in cross-section.

4. An assembly according to claim 1 characterized in that each body section (6) is made of two shells (7, 8) assembled by interengagement of cooperable configurations at longitudinally extending side edges thereof.

5. An assembly according to claim 4 characterized in that the cooperable configuration at the said side edges of the shells (7, 8) are tongue and groove configurations.

6. An assembly according to claim 1 characterized in that the cooperable configurations at the ends of the body sections (6) are tongue and groove configurations.

7. An assembly according to claim 1 characterized in that the housing (3) has at least one end, an end section (13)

which cooperably interengages with the end of the adjacent body section (6) and covers and seals the end of the housing (3).

8. An assembly according to claim 1 characterized in that the housing (3) has at least one end, an end section (14) which provides an enclosure or enclosures (16, 17) to receive connection terminals for the conductors and/or neutral cross-bars.

9. An assembly according to claim 7 characterized in that said end section (13) is formed from interconnected shells.

10. An assembly according to claim 1 characterized in that the body sections have slots (11) therethrough to receive the transverse terminals.

11. An assembly according to claim 10 characterized in that the slots (11) are in two sets on opposite sides aligned with each other.

12. An assembly according to claim 10 characterized in that the slots (11) are bounded by recesses (12) to receive sealing grommets (23) around the terminals (5a).

13. An assembly according to claim 1 characterized in that the conductors (5) comprise strips of conductive material cut to define an elongate body with the transverse terminals (5a) extending outwardly therefrom.

14. An assembly according to claim 1 characterized in that there are three conductive strips (5) for three live phases, and each body section has at each of two opposed sides three slots (11) to receive three transverse terminals (5a) respectively of each phase.

15. An assembly according to claim 14 characterized by the provision of a fourth neutral strip (18) which runs along the housing.

16. As assembly according to claim 15 characterized in that the neutral strip (18) is inserted between two of the live phase strips (5).

17. An assembly according to claim 1 characterized in that the body sections (6) are all of like construction.

18. A container, particularly for an assembly according to claim 1 which is adapted to house the assembly (24), said container (25) having a front wall (30) with at least one elongate opening (31) therein to provide access to electrical devices (2) connected to the assembly (24) within the container, and wherein a cover strip (43) is mountable over the opening (31), characterized in that the cover strip (43) has portions (44) thereof adapted to provide access slots for said electrical devices (2) and the cover strip (43) is positionally adjustable.

19. A container according to claim 18 characterized in that the cover strip (43) is wider than the opening (31) and is positionally adjustable by sliding sideways whilst covering the opening (31).

20. A container according to claim 19 characterized in that the cover strip (43) is slidable between limits.

21. A container according to claim 20 characterized in that the limits are defined by engagement of at least one finger (47) projecting from the cover strip (43) with a respective closed end channel or slot on the front wall (30).

22. A container according to claim 18 characterized in that the said portions (44) of the strip are push-out sections.

23. A container, particularly for an assembly according to claim 1 which is adapted to house the assembly (24), said container (25) having a back wall (26) on which the assembly is mountable via the intermediary of raised bridge structures (34) having legs (37) extending transversely to the back wall (26) and an elongate support structure (39) arranged to be fixed to the legs (37) along at least one side of the assembly characterized in that the support structure (39) is fixable to the legs (37) at a plurality of positions differently spaced from the back wall (26).

24. A container according to claim 23 characterized in that guide markings are provided on the legs (37) for alignment with the support structure (39) at the said different positions.

25. A container according to claim 24 characterized in that the support structure (39) comprises an angle strip.

26. A container, particularly for an assembly according to claim 23 which is adapted to house the assembly (24), said container (25) having a front wall (30) with at least one elongate opening (31) therein to provide access to electrical devices (2) connected to the assembly (24) within the container, and wherein a cover strip (43) is mountable over the opening (31), characterized in that the cover strip (43) has portions (44) thereof adapted to provide access slots for said electrical devices (2) and the cover strip (43) is positionally adjustable.

* * * * *